United States Patent
Fujii et al.

(10) Patent No.: US 10,635,089 B2
(45) Date of Patent: Apr. 28, 2020

(54) SERVO CONTROL DEVICE

(71) Applicant: Mitsubishi Electric Corporation, Chiyoda-ku (JP)

(72) Inventors: Kenta Fujii, Tokyo (JP); Hidetoshi Ikeda, Tokyo (JP); Teruaki Fukuoka, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/781,218

(22) PCT Filed: Feb. 15, 2017

(86) PCT No.: PCT/JP2017/005464
§ 371 (c)(1),
(2) Date: Jun. 4, 2018

(87) PCT Pub. No.: WO2017/212685
PCT Pub. Date: Dec. 14, 2017

(65) Prior Publication Data
US 2019/0086900 A1 Mar. 21, 2019

(30) Foreign Application Priority Data
Jun. 9, 2016 (JP) .................. 2016-115231

(51) Int. Cl.
*G05B 19/414* (2006.01)
*B23Q 1/44* (2006.01)
(Continued)

(52) U.S. Cl.
CPC .......... *G05B 19/414* (2013.01); *B23Q 1/445* (2013.01); *G05B 19/19* (2013.01); *G05D 3/00* (2013.01); *G05D 3/12* (2013.01); *H02P 5/46* (2013.01)

(58) Field of Classification Search
CPC ...... G05B 19/414; G05B 19/19; B23Q 1/445; H02P 5/46
See application file for complete search history.

(56) References Cited

U.S. PATENT DOCUMENTS

| | | | |
|---|---|---|---|
| 2001/0008370 A1* | 7/2001 | Fujita | G05B 19/19 318/560 |
| 2007/0040527 A1 | 2/2007 | Cardinale et al. | |
| 2011/0241594 A1* | 10/2011 | Fujita | G05B 5/01 318/625 |

FOREIGN PATENT DOCUMENTS

JP 2007-95035 A 4/2007

OTHER PUBLICATIONS

International Search Report dated Apr. 4, 2017 in PCT/JP2017/005464 filed Feb. 15, 2017.

* cited by examiner

*Primary Examiner* — Cortez M Cook
(74) *Attorney, Agent, or Firm* — Oblon, McClelland, Maier & Neustadt, L.L.P.

(57) ABSTRACT

A servo control device controls a combined position of a first servo system and a second servo system having higher response than response of the first servo system. The servo control device includes a first axis target value creation unit and a correction unit. The first axis target value creation unit creates a first axis target value based on a combined command value which is a position command value of the combined position. The correction unit converts the first axis target value into a first axis command value by using a first transfer function. In addition, the correction unit converts the first axis target value by using a second transfer function, and calculates a second axis command value by subtracting the converted first axis target value from the combined command value. The product of the first transfer function (Continued)

and a first model transfer function which models characteristics of the first servo system is equal to the product of the second transfer function and a second model transfer function which models characteristics of the second servo system.

14 Claims, 9 Drawing Sheets

(51) Int. Cl.
*G05B 19/19* (2006.01)
*H02P 5/46* (2006.01)
*G05D 3/00* (2006.01)
*G05D 3/12* (2006.01)

SERVO CONTROL DEVICE

FIELD

The present invention relates to a servo control device which executes tracing control.

BACKGROUND

When machining is performed using a laser processing machine or a machine tool, tracing control is performed in which a position of a tip of worktool is controlled to move along a command path. The tracing control is executed by servo control such that an actual position of each movable axis of a machine tracks a position command value of corresponding movable axis.

In a typical machine, one motor is used for one direction of movement. In a case where servo control is performed using one motor for one direction of movement, tracking error caused by response delay of a servo control system becomes a problem. In addition, because there is a limitation in a thrust which can be generated by a motor, acceleration at which the motor can drive is limited, which results in a problem in that rapid response cannot be achieved. When a high-speed operation of at least several tens of meters per minute is required, an influence of tracking error or insufficient response is particularly remarkable.

Accordingly, a device has been proposed in which an additional motor with rapid response is added to a motor which has been used so far, and motion in one direction of movement is controlled by using two motors having different response. For example, Patent Literature 1 discloses a technique of performing tracing control using a cooperative control system which includes a low-speed servo system and a high-speed servo system having higher response than the low-speed servo system.

CITATION LIST

Patent Literature

Patent Literature 1: Japanese Patent Application Laid-open No. 2007-95035

SUMMARY

Technical Problem

According to Patent Literature 1 described above, when calculating a command value to the low-speed servo system and a command value to the high-speed servo system from a command value of a worktool position, a difference between the command value of the worktool position and the command value to the low-speed servo system is set as a command value to the high-speed servo system. However, since response delays occurring in the low-speed servo system and those occurring in the high-speed servo system are different from each other, there is a problem in that a combined response obtained by combining a servo response of the low-speed servo system and a servo response of the high-speed servo system does not correctly track the command value of the worktool position.

It is an object of the present invention to obtain a servo control device which achieves more precise tracing control in a cooperative control system which includes a low-speed servo system and a high-speed servo system.

Solution to Problem

In order to solve the above-described problems and to achieve the object, a servo control device of the present invention controls a first servo system and a second servo system having higher response than the first servo system. The first servo system causes a position of a first axis driven by a first motor on a first axis base to track a first axis command value. The second servo system causes a position of a second axis driven by a second motor on a second axis base to track a second axis command value. The second axis base is an axis moving in the same direction as the first axis base. The servo control device controls a combined position of the position of the first axis and the position of the second axis. The servo control device includes a first axis target value creation unit and a correction unit. The first axis target value creation unit creates a first axis target value from a combined command value which is a position command value of the combined position. The correction unit converts the first axis target value into the first axis command value by using a first transfer function. In addition, the correction unit converts the first axis target value by using a second transfer function, and calculates the second axis command value by subtracting the converted first axis target value from the combined command value. The product of the first transfer function and a first model transfer function which models characteristics of the first servo system is equal to the product of the second transfer function and a second model transfer function which models characteristics of the second servo system.

Advantageous Effects of Invention

According to the present invention, it is possible to obtain a servo control device which achieves more precise tracing control in a cooperative control system which includes a low-speed servo system and a high-speed servo system.

DESCRIPTION OF EMBODIMENTS

Hereinafter, a servo control device according to each embodiment of the present invention will be described in detail with reference to the drawings. The invention is not limited to the embodiments.

First Embodiment

Figure 1:
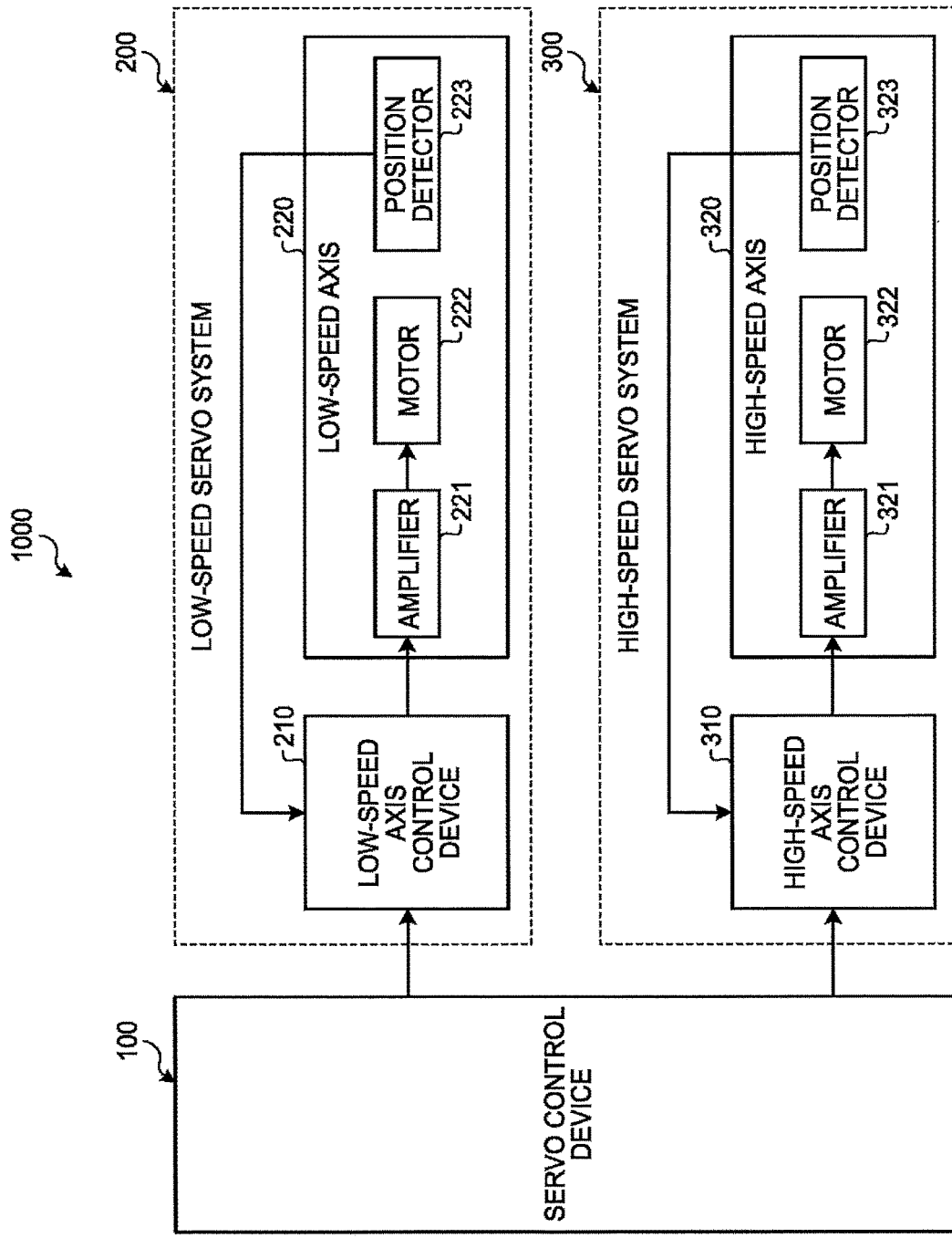
FIG. 1 is a diagram illustrating a configuration of a cooperative control system of a first embodiment.

FIG. 1 is a diagram illustrating a configuration of a cooperative control system to which a servo control device according to a first embodiment is applied. The cooperative control system 1000 includes the servo control device 100, a low-speed servo system 200 which is a first servo system, and a high-speed servo system 300 which is a second servo system. The high-speed servo system 300 has higher response than the low-speed servo system 200. The servo control device 100 controls the low-speed servo system 200 and the high-speed servo system 300.

The low-speed servo system 200 includes a low-speed axis control device 210 and a low-speed axis 220 which is a first axis. The high-speed servo system 300 includes a high-speed axis control device 310 and a high-speed axis 320 which is a second axis.

Figure 2:
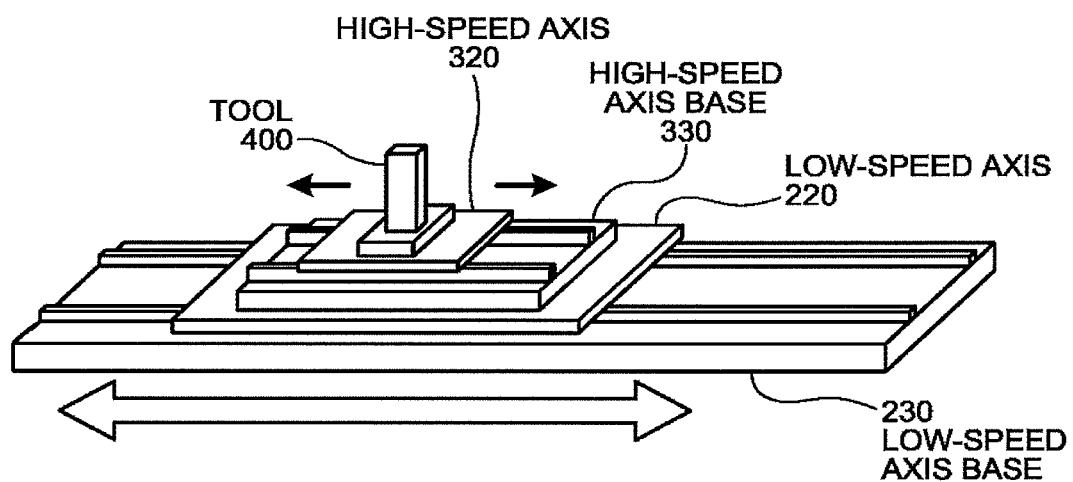
FIG. 2 is a view illustrating a configuration of a machine to be controlled of the first embodiment.

The low-speed axis 220 and the high-speed axis 320 constitute a machine to be controlled. FIG. 2 is a view illustrating a configuration of the machine to be controlled. The machine to be controlled includes the low-speed axis 220, a low-speed axis base 230 which is a first axis base, the high-speed axis 320, a high-speed axis base 330 which is a second axis base, and a worktool 400. The machine to be controlled moves the worktool 400 in a uniaxial direction which is a lateral direction on the plane of the drawing. The low-speed axis 220 is movable on the low-speed axis base 230 in the lateral direction on the plane of the drawing. The high-speed axis 320 is movable on the high-speed axis base 330 in the lateral direction on the plane of the drawing. The low-speed axis 220 is a movable portion of the low-speed axis base 230, and the high-speed axis 320 is a movable portion of the high-speed axis base 330. The high-speed axis base 330 is fixed to the low-speed axis 220. That is, the high-speed axis base 330 is attached to the low-speed axis 220, and the direction of the high-speed axis base 330 and the direction of the low-speed axis base 230 are the same. The worktool 400 is fixed to the high-speed axis 320. A position of the worktool 400 is the sum of the position of the low-speed axis 220 and the position of the high-speed axis 320. In other words, the position of the worktool 400 is a combined position of the position of the low-speed axis 220 and the position of the high-speed axis 320.

Returning to FIG. 1. The low-speed axis 220 includes an amplifier 221, a motor 222 which is a first motor, and a position detector 223. The motor 222 drives the low-speed axis 220, which is a movable portion, on the low-speed axis base 230. The amplifier 221 supplies a current to the motor 222 so that the motor 222 generates a thrust for driving the low-speed axis 220 in accordance with a low-speed axis thrust command value input from the low-speed axis control device 210. The low-speed axis thrust command value is a first axis thrust command value. The position detector 223 detects the position of the low-speed axis 220 on the low-speed axis base 230, and outputs a position signal indicating a detection value.

The type of the position detector 223 is not limited to a specific type. In one example, the position detector 223 is a rotary encoder attached to the motor 222. In another example, the position detector 223 is a linear encoder attached to the low-speed axis 220.

The low-speed axis control device 210 receives a low-speed axis command value which is a first axis command value from the servo control device 100 and receives the position signal from the position detector 223. The low-speed axis control device 210 calculates a low-speed axis thrust command value based on compensation control for causing the position of the low-speed axis 220 indicated by the position signal to track the low-speed axis command value. The low-speed axis control device 210 inputs the calculated low-speed axis thrust command value to the amplifier 221 of the low-speed axis 220.

With the configuration described above, the low-speed servo system 200 can cause the position of the low-speed axis 220 on the low-speed axis base 230 to track a low-speed axis command value Xrsl32.

The high-speed axis 320 includes an amplifier 321, a motor 322 which is a second motor, and a position detector 323. The motor 322 drives the high-speed axis 320, which is a movable portion, on the high-speed axis base 330. The amplifier 321 supplies a current to the motor 322 so that the motor 322 generates a thrust for driving the high-speed axis 320 in accordance with a high-speed axis thrust command value input from the high-speed axis control device 310. The high-speed axis thrust command value is a second axis thrust command value. The position detector 323 detects the position of the high-speed axis 320 on the high-speed axis base 330, and outputs a position signal indicating a detection value.

The type of the position detector 323 is not limited to a specific type. In one example, the position detector 323 is a rotary encoder attached to the motor 322. In another example, the position detector 323 is a linear encoder attached to the high-speed axis 320.

The high-speed axis control device 310 receives a high-speed axis command value which is a second axis command value from the servo control device 100 and receives the position signal from the position detector 323. The high-speed axis control device 310 calculates a high-speed axis thrust command value based on compensation control for causing the position of the high-speed axis 320 indicated by the position signal to track the high-speed axis command value. The high-speed axis control device 310 inputs the calculated high-speed axis thrust command value to the amplifier 321 of the high-speed axis 320.

With the configuration described above, the high-speed servo system 300 can cause the position of the high-speed axis 320 on the high-speed axis base 330 in the same direction as the low-speed axis base 230 attached to the low-speed axis 220 to track a high-speed axis command value Xrfl33.

As illustrated in FIG. 2, a body of the low-speed axis 220 is larger in size and weight than a body of the high-speed axis 320. Therefore, the low-speed servo system 200 has lower response than the high-speed servo system 300. If the worktool 400 is driven only by the low-speed servo system 200, the response is insufficient and an error between the position command value and the position of the worktool 400 increases. On the other hand, in the first embodiment, the response of the cooperative control system 1000 is improved by performing cooperative control of the low-speed servo system 200 and the high-speed servo system 300 having higher response than the low-speed servo system 200. Specifically, the servo control device 100 calculates the low-speed axis command value and the high-speed axis command value from the combined command value which is a position command value of the position of the worktool 400. Then, the servo control device 100 outputs the calculated low-speed axis command value to the low-speed axis control device 210 constituting the low-speed servo system 200, and outputs the calculated high-speed axis command value to the high-speed servo system 300.

Figure 3:
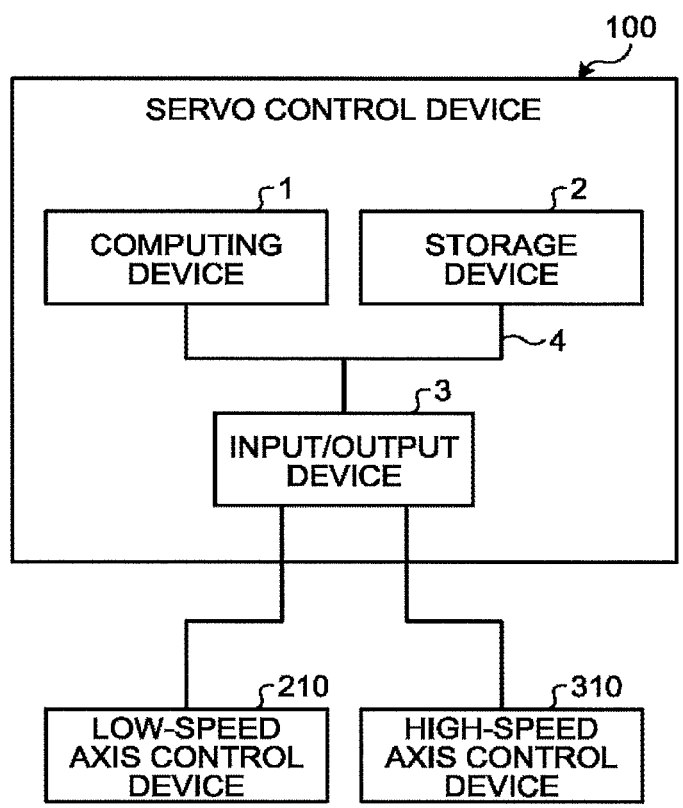
FIG. 3 is a diagram illustrating a hardware configuration example of a servo control device of the first embodiment.

FIG. 3 is a diagram illustrating a hardware configuration example of the servo control device 100 of the first embodiment. The servo control device 100 includes a computing device 1, a storage device 2, and an input/output device 3. The computing device 1, the storage device 2, and the input/output device 3 are mutually connected through a bus 4. The computing device 1 executes a computer program, and is a Central Processing Unit (CPU) in one example. The storage device 2 stores a computer program in advance. The computing device 1 achieves each functional configuration described later by executing the computer program stored in the storage device 2. The storage device 2 may be constituted, for example, by a Read Only Memory (ROM), a Random Access Memory (RAM), a flash memory, a Hard Disk Drive (HDD), or a combination thereof. The input/output device 3 is an interface device for the servo control device 100 to perform input and output of information with respect to other devices. In the embodiment, the input/output device 3 is connected to the low-speed axis control device 210 and the high-speed axis control device 310.

Figure 4:
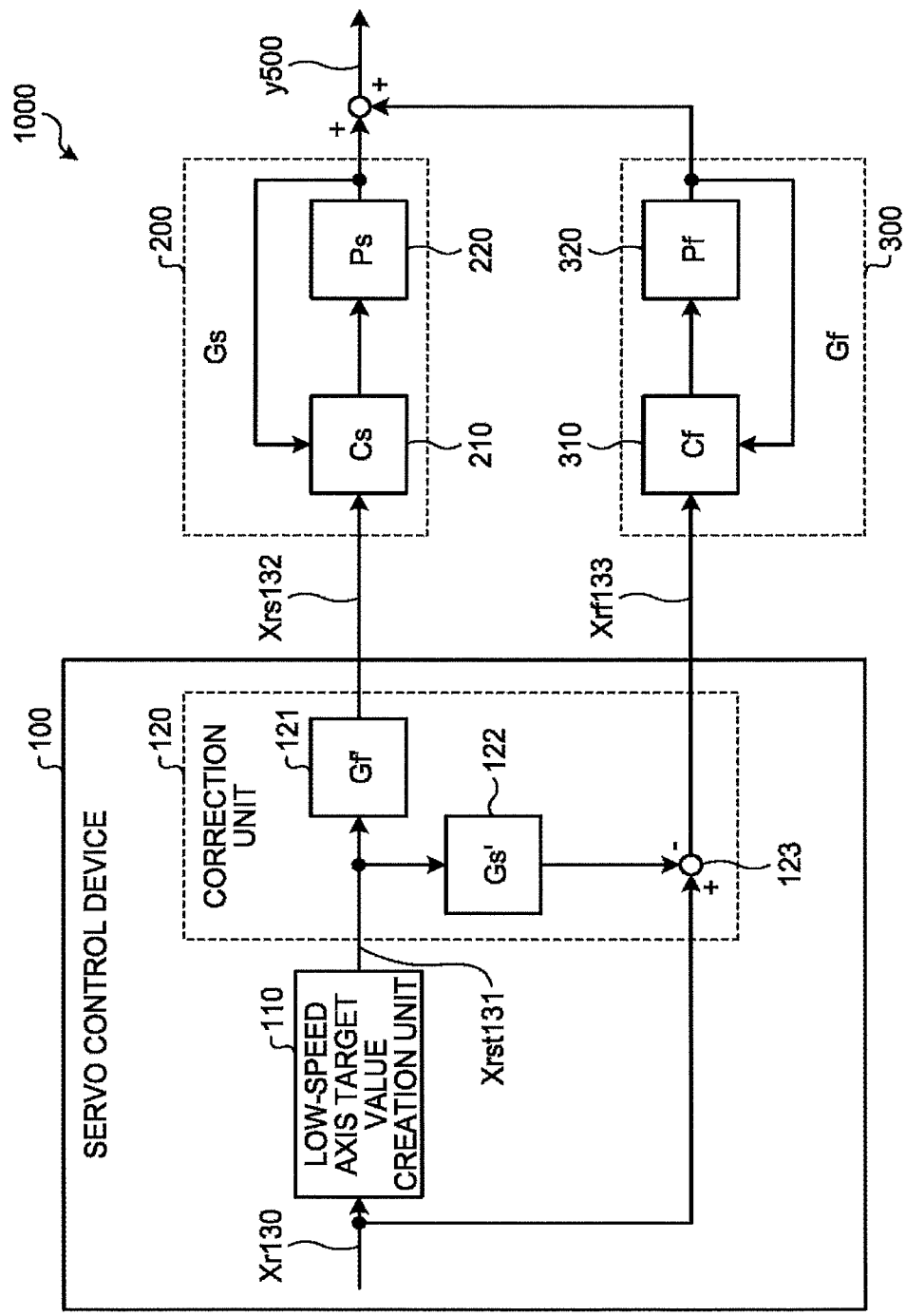
FIG. 4 is a diagram illustrating a functional configuration of the cooperative control system of the first embodiment.

FIG. 4 is a diagram illustrating a functional configuration of the cooperative control system 1000 of the first embodiment. FIG. 4 illustrates the functional configuration of the cooperative control system 1000 of the first embodiment in the form of a block diagram.

The servo control device 100 includes a low-speed axis target value creation unit 110 and a correction unit 120.

The low-speed axis target value creation unit 110 creates a low-speed axis target value Xrst131 based on a combined command value Xr130. In one example, the combined command value Xr130 is given from a user program executed by the computing device 1 or an external computing device. A method for creating the low-speed axis target value Xrst131 is arbitrary. In one example, the low-speed axis target value creation unit 110 creates the low-speed axis target value Xrst131 by removing high-frequency components from the combined command value Xr130 using a first-order low pass filter.

The correction unit 120 includes a first transfer function unit 121, a second transfer function unit 122, and a subtractor 123. The first transfer function unit 121 converts the low-speed axis target value Xrst131 into the low-speed axis command value Xrs132 using the first transfer function. The second transfer function unit 122 converts the low-speed axis target value Xrst131 using the second transfer function. The subtractor 123 calculates the high-speed axis command value Xrf133 by subtracting the low-speed axis target value converted by the second transfer function unit 122 from the combined command value Xr130.

In FIG. 4, a transfer function of the first transfer function unit 121 is expressed as Gf', and a transfer function of the second transfer function unit 122 is expressed as Gs'. A transfer function which models characteristics of the low-speed axis control device 210 is expressed as Cs, and a transfer function which models characteristics of the low-speed axis 220 is expressed as Ps. A low-speed axis model transfer function, which is a first model transfer function that models characteristics of the low-speed servo system 200, is expressed as Gs. A transfer function which models characteristics of the high-speed axis control device 310 is expressed as Cf, and a transfer function which models characteristics of the high-speed axis 320 is expressed as Pf. A high-speed axis model transfer function, which is a second model transfer function that models characteristics of the high-speed servo system 300, is expressed as Gf. A combined position y500 can be expressed as Formula 1 below.

$$y = Gf'GsXrst + GfXr - Gs'GfXrst \qquad \text{(Formula 1)}$$

Here, in the first embodiment, the first transfer function Gf' is equal to Gf which is the high-speed axis model transfer function. In addition, the second transfer function Gs' is equal to Gs which is the low-speed axis model transfer function. That is, the low-speed axis command value Xrs132 is an estimate of the position of the high-speed axis 320 in a case where the low-speed axis target value Xrst131 is input to the high-speed servo system 300, and the low-speed axis target value converted using the second transfer function Gs' is an estimate of the position of the low-speed axis 220 in a case where the low-speed axis target value Xrst131 is input to the low-speed servo system 200. Therefore, a transfer function Gw from the combined command value Xr130 to the combined position y500 coincides with Gf which models the characteristics of the high-speed servo system 300 as indicated by Formula 2.

$$Gw = y/Xr = Gf \qquad \text{(Formula 2)}$$

As described above, the servo control device 100 of the first embodiment includes the low-speed axis target value creation unit 110 and the correction unit 120. The low-speed axis target value creation unit 110 creates the low-speed axis target value Xrst131 based on the combined command value Xr130. The correction unit 120 converts the low-speed axis target value Xrst131 into the low-speed axis command value Xrs132 using the first transfer function Gf', converts the low-speed axis target value Xrst131 using the second transfer function Gs', and subtracts the converted low-speed axis target value Xrst131 from the combined command value Xr130, thereby calculating the high-speed axis command value Xrf133. The first transfer function Gf' is equal to Gf which is the high-speed axis model transfer function, and the second transfer function Gs' is equal to Gs which is the low-speed axis model transfer function. With the above configuration, the transfer function Gw from the combined command value Xr130 to the combined position y500 can be made to coincide with the high-speed axis model transfer function Gf. In another viewpoint, a difference in response between the low-speed servo system 200 and the high-speed servo system 300 does not affect the combined position y500. Therefore, according to the first embodiment, it is possible to cause the combined position y500 of the position of the low-speed axis 220 and the position of the high-speed axis 320, to track the given combined command value Xr130 with high response. In other words, in the cooperative control system 1000 which includes the low-speed servo system 200 and the high-speed servo system 300, it is possible to achieve highly precise tracing control.

As described above, a response characteristic of the combined position y500 is determined by the high-speed servo system 300. Therefore, in a case where a servo control system having a control band higher than the low-speed servo system 200 is applied to the high-speed servo system 300, or a case where a servo control system having a larger acceleration limit value for each of the axes 220 and 320 than the low-speed servo system 200 is applied to the high-speed servo system 300, it is possible to achieve more highly precise tracing control than in a case where the worktool 400 is driven using only the low-speed servo system 200.

A method for creating the low-speed axis target value Xrst131 by the low-speed axis target value creation unit 110 is not limited exclusively to the above method. As long as each of the low-speed axis 220 and the high-speed axis 320 can be operated within a range not exceeding a movable range, the low-speed axis target value creation unit 110 can create the low-speed axis target value Xrst131 by an arbitrary method. In one example, the low-speed axis target value creation unit 110 may create the low-speed axis target value Xrst131 by calculating ¼ of the combined command value Xr130.

In addition, the first transfer function only has to be a model which models the characteristics of the low-speed servo system 200, and is not limited exclusively to a linear model expressed as a transfer function. The first transfer function may be a general linear model, a nonlinear model, or a delay model.

Similarly, the second transfer function only has to be a model which models the characteristics of the high-speed servo system 300, and is not limited exclusively to a linear model expressed as a transfer function. The second transfer function may be a general linear model, a nonlinear model, or a delay model.

Furthermore, characteristics of the first transfer function and the second transfer function are not limited to the above. As a more general expression, when the first transfer function and the second transfer function are expressed as Hs and Hf, respectively, the combined position y500 is expressed as (Formula 3).

$$y = HsGsXrst + GfXr - HfGfXrst \quad \text{(Formula 3)}$$

Here, when the first transfer function Hs and the second transfer function Hf are defined such that the product of Hs and the low-speed axis model transfer function Gs coincides with the product of Hf and the high-speed axis model transfer function Gf, a relationship of Formula 2 described above can be obtained. That is, by defining Hs and Hf such that the product of Hs and Gs coincides with the product of Hf and Gf, it is possible to cause the combined position y500 of the position of the low-speed axis 220 and the position of the high-speed axis 320 to track the given combined command value Xr130 precisely.

That is, causing the first transfer function to coincide with the high-speed axis model transfer function and further causing the second transfer function to coincide with the low-speed axis model transfer function, which has been described in the first embodiment, is one example of causing the product of the first transfer function and the low-speed axis model transfer function to coincide with the product of the second transfer function and the high-speed axis model transfer function.

The shapes of the low-speed axis base 230 and the high-speed axis base 330 are not limited exclusively to a linear shape. As long as the low-speed axis 220 and the high-speed axis 320 are movable in the same direction, the shapes of the low-speed axis base 230 and the high-speed axis base 330 are arbitrary. In one example, the shapes of the low-speed axis base 230 and the high-speed axis base 330 may be a circular or arc shape.

The high-speed axis base 330 may not necessarily be fixed to the low-speed axis 220. As long as the low-speed axis 220 and the high-speed axis 320 are movable in the same direction, the low-speed axis base 230 and the high-speed axis base 330 may be separately arranged. In one example, the low-speed axis base 230 is arranged below the high-speed axis base 330, and a workpiece is fixed to the low-speed axis 220. The high-speed axis base 330 is arranged above the low-speed axis base 230, and the worktool 400 is fixed to the high-speed axis 320 downwardly toward the workpiece. Assuming that the driving direction of the low-speed axis base 230 is positive in the rightward direction and the driving direction of the high-speed axis base 330 is positive in the leftward direction in such a machine to be controlled, the position of the worktool 400 with respect to the workpiece is the sum of the position of the low-speed axis 220 and the position of the high-speed axis 320, that is, a position obtained by combining the position of the low-speed axis 220 and the position of the high-speed axis 320. Therefore, the technique of the first embodiment can be applied to a servo control device which controls such a machine to be controlled.

It has been described in the above that the low-speed axis control device 210 and the high-speed axis control device 310 are connected to the servo control device 100. One or both of the low-speed axis control device 210 and the high-speed axis control device 310 may be included in the servo control device 100.

It has been described in the above that the low-speed axis target value creation unit 110 and the correction unit 120 are realized by the computing device 1 executing a computer program. A part or all of the low-speed axis target value creation unit 110 and the correction unit 120 may be realized by a hardware circuit.

Second Embodiment

In the second embodiment, settings of the first transfer function and the second transfer function are different from those in the first embodiment. The second embodiment is another example of causing the product of the first transfer function and the low-speed axis model transfer function to coincide with the product of the second transfer function and the high-speed axis model transfer function.

Figure 5:
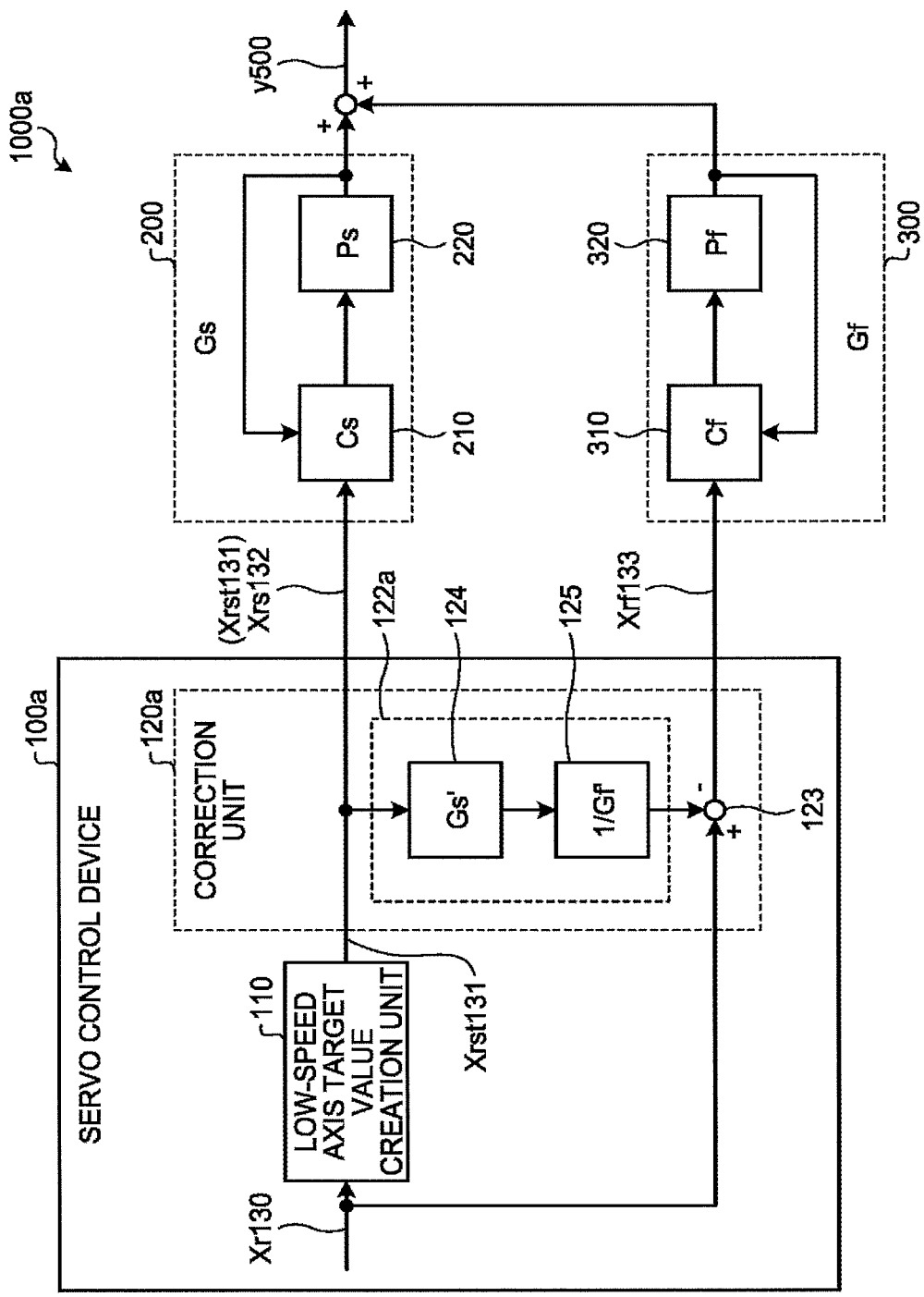
FIG. 5 is a diagram illustrating a functional configuration of a cooperative control system of a second embodiment.

FIG. 5 is a diagram illustrating a functional configuration of a cooperative control system of the second embodiment. Reference signs 1000a and 100a are assigned to the cooperative control system of the second embodiment and a servo control device of the second embodiment, respectively. In addition, the same names and reference signs as those in the first embodiment are assigned to components in common with the first embodiment, and overlapping descriptions will be omitted.

The servo control device 100a includes the low-speed axis target value creation unit 110 and a correction unit 120a.

The correction unit 120a includes a second transfer function unit 122a and the subtractor 123. The correction unit 120a receives the low-speed axis target value Xrst131 as input and outputs the input low-speed axis target value Xrst131 to the low-speed axis control device 210 as it is. That is, in the second embodiment, the low-speed axis command value Xrs132 is equal to the low-speed axis target value Xrst131, and a first transfer function of the second embodiment corresponds to "1".

The second transfer function unit 122a includes a third transfer function unit 124 and a fourth transfer function unit 125. A transfer function of the third transfer function unit 124 is Gs' which is a low-speed axis model transfer function and a transfer function of the fourth transfer function unit 125 is 1/Gf' which is an inverse of the high-speed axis model transfer function. That is, a second transfer function of the second embodiment is the product of the inverse high-speed axis model transfer function 1/Gf' and the low-speed axis model transfer function Gs'.

The subtractor 123 subtracts, from the combined command value Xr130, the low-speed axis target value Xrst131 converted by the product of the inverse high-speed axis model transfer function 1/Gf' and the low-speed axis model transfer function Gs', thereby calculating the high-speed axis command value Xrf133.

With the above configuration, the combined position y500 is expressed as Formula 4 below.

$$y = GfXr - GfGs'(1/Gf')Xrst + GsXrst \quad \text{(Formula 4)}$$

In Formula 4, a second term on the right side and a third term on the right side cancel each other out. Therefore, Formula 2 is established also in the second embodiment.

As described above, according to the second embodiment, the first transfer function is "1" and the second transfer function is equal to the product of the inverse high-speed axis model transfer function and the low-speed axis model transfer function. Since the difference in response between the low-speed servo system 200 and the high-speed servo system 300 does not affect the combined position y500 and the response characteristic of the combined position y500 is determined by the high-speed servo system 300, it is possible to achieve highly precise tracing control in the cooperative control system 1000a which includes the low-speed servo system 200 and the high-speed servo system 300, similarly to the first embodiment. In addition, it is possible to achieve more highly precise tracing control than in a case of driving the worktool 400 using only the low-speed servo system 200.

Third Embodiment

In a case where the low-speed axis 220 and the high-speed axis 320 are connected via the high-speed axis base 330, an interference force acts on the high-speed axis 320 by the motor 222 driving the low-speed axis 220. In addition, an interference force acts on the low-speed axis 220 by the motor 322 driving the high-speed axis 320. When an interference force acts between the low-speed axis 220 and the high-speed axis 320, the tracking accuracy of the low-speed axis 220 with respect to the low-speed axis command value Xrs132 deteriorates and the tracking accuracy of the high-speed axis 320 with respect to the high-speed axis command value Xrf133 deteriorates. Consequently, the tracking accuracy of the combined position y500 with respect to the combined command value Xr130 deteriorates.

Accordingly, in the third embodiment, a servo control device corrects each thrust command value in consideration of the influence of the interference force.

Figure 6:
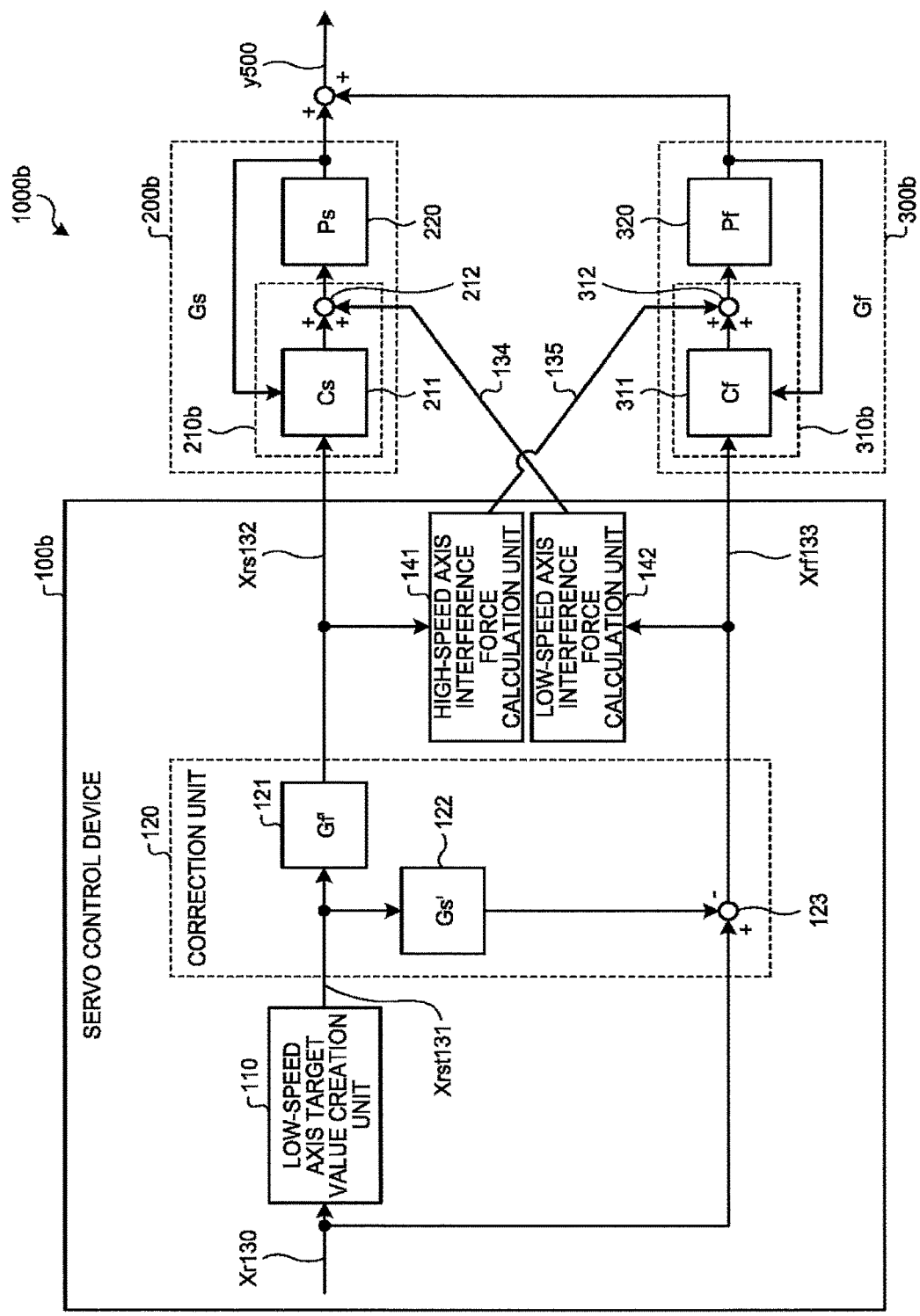
FIG. 6 is a diagram illustrating a functional configuration of a cooperative control system of a third embodiment.

FIG. 6 is a diagram illustrating a functional configuration of a cooperative control system of the third embodiment. Reference signs 1000b, 100b, 200b, and 300b are assigned to the cooperative control system of the third embodiment, the servo control device of the third embodiment, a low-speed servo system of the third embodiment, and a high-speed servo system of the third embodiment, respectively. In addition, the same names and reference signs as those in the first embodiment are assigned to components in common with the first embodiment, and overlapping descriptions will be omitted.

The servo control device 100b includes the low-speed axis target value creation unit 110, the correction unit 120, a high-speed axis interference force calculation unit 141 which is a first interference force calculation unit, and a low-speed axis interference force calculation unit 142 which is a second interference force calculation unit. The low-speed servo system 200b includes a low-speed axis control device 210b and the low-speed axis 220. The high-speed servo system 300b includes a high-speed axis control device 310b and the high-speed axis 320.

The high-speed axis interference force calculation unit 141 calculates a first interference force, which is an interference force exerted on the high-speed axis 320 by the low-speed axis 220 being driven, based on the low-speed axis command value Xrs132. Then, the high-speed axis interference force calculation unit 141 subtracts the first interference force from the high-speed axis thrust command value. In one example, the high-speed axis interference force calculation unit 141 outputs a first interference force cancellation input 135 which is a value obtained by inverting a sign of the first interference force.

The high-speed axis control device 310b includes a high-speed axis compensation unit 311, which is a second axis compensation unit, and an adder 312. The high-speed axis compensation unit 311 outputs the high-speed axis thrust command value by control similar to control of the high-speed axis control device 310 of the first embodiment. The adder 312 adds the high-speed axis thrust command value output by the high-speed axis compensation unit 311 and the first interference force cancellation input 135, and inputs the high-speed axis thrust command value to which the first interference force cancellation input 135 has been added to the amplifier 321 of the high-speed axis 320.

The low-speed axis interference force calculation unit 142 calculates a second interference force, which is an interference force exerted on the low-speed axis 220 by the high-speed axis 320 being driven, based on the high-speed axis command value Xrf133. Then, the low-speed axis interference force calculation unit 142 subtracts the second interference force from the low-speed axis thrust command value. In one example, the low-speed axis interference force calculation unit 142 outputs a second interference force cancellation input 134 which is a value obtained by inverting a sign of the second interference force.

The low-speed axis control device 210b includes a low-speed axis compensation unit 211, which is a first axis compensation unit, and an adder 212. The low-speed axis compensation unit 211 outputs the low-speed axis thrust command value by performing control similar to control of the low-speed axis control device 210 of the first embodiment. The adder 212 adds the low-speed axis thrust command value output by the low-speed axis compensation unit 211 and the second interference force cancellation input 134, and inputs the low-speed axis thrust command value to which the second interference force cancellation input 134 has been added to the amplifier 221 of the low-speed axis 220.

Next, details of the high-speed axis interference force calculation unit 141 and the low-speed axis interference force calculation unit 142 will be described.

The first interference force Ff acts on the high-speed axis 320 by acceleration and deceleration of the low-speed axis 220, and the second interference force Fs acts on the low-speed axis 220 by acceleration and deceleration of the high-speed axis 320. When the sum of the masses of the high-speed axis 320 and the worktool 400 is expressed as Wf, the acceleration of the high-speed axis 320 is expressed as Af, and the acceleration of the low-speed axis 220 is expressed as As, the first interference force Ff is expressed as Formula 5, and the second interference force Fs is expressed as Formula 6.

$$Ff = -AsWf \quad \text{(Formula 5)}$$

$$Fs = -AfWf \quad \text{(Formula 6)}$$

The first interference force cancellation input 135 is obtained as follows. The high-speed axis interference force calculation unit 141 is constituted by a low-speed axis model having characteristics of the low-speed servo system 200b and a second-order differentiator. The high-speed axis interference force calculation unit 141 inputs the low-speed axis command value Xrs132 to the low-speed axis model to obtain a low-speed axis predicted position. Then, the high-speed axis interference force calculation unit 141 calculates low-speed axis predicted acceleration As' by applying the second-order differentiator to the obtained low-speed axis predicted position to perform second-order differentiation with respect to time. As indicated by Formula 5, a negative of a value obtained by multiplying the total weight Wf of the body, which is driven by the motor 322 of the high-speed servo system 300b, by the acceleration As of the low-speed axis 220 is an interference force generated in the high-speed axis 320 by the motor 222 driving the low-speed axis 220. Consequently, the high-speed axis interference force calculation unit 141 obtains the first interference force cancellation input 135 by multiplying the total weight Wf of the body, which is driven by the motor 322 of the high-speed servo system 300b, by the low-speed axis predicted acceleration As'.

The second interference force cancellation input 134 is obtained as follows. The low-speed axis interference force calculation unit 142 is constituted by a high-speed axis model having characteristics of the high-speed servo system 300b and a second-order differentiator. The low-speed axis interference force calculation unit 142 inputs the high-speed axis command value Xrf133 to the high-speed axis model to obtain a high-speed axis predicted position. Then, the low-speed axis interference force calculation unit 142 calculates high-speed axis predicted acceleration Af' by applying the second-order differentiator to the obtained high-speed axis predicted position to perform second-order differentiation with respect to time. As indicated by Formula 6, a negative of a value obtained by multiplying the total weight Wf of the body driven by the motor 322 of the high-speed servo system 300b by the acceleration Af of the high-speed axis 320, is an interference force generated in the low-speed axis 220 by the motor 322 driving the high-speed axis 320. Consequently, the low-speed axis interference force calculation unit 142 obtains the second interference force cancellation input 134 by multiplying the total weight Wf of the body driven by the motor 322 of the high-speed servo system 300b by the high-speed axis predicted acceleration Af'.

When three transfer functions, i.e. the second transfer function Gs', the low-speed axis model transfer function Gs when the second interference force cancellation input 134 is zero, and the transfer function of the low-speed axis model in the high-speed axis interference force calculation unit 141 are coincided with one another, and three transfer functions, i.e. the first transfer function Gf', the high-speed axis model transfer function Gf when the first interference force cancellation input 135 is zero, and the transfer function of the high-speed axis model in the low-speed axis interference force calculation unit 142 are coincided with one another, the second interference force generated in the low-speed axis 220 is canceled by the second interference force cancellation input 134, and the first interference force generated in the high-speed axis 320 is canceled by the first interference force cancellation input 135. This makes it possible to eliminate the influence of the interference force. Consequently, the transfer function from the combined command value Xr130 to the combined position y500 coincides with the high-speed axis model transfer function when the first interference force cancellation input 135 is zero.

Therefore, even when the interference force acts on the high-speed axis 320 by driving the low-speed axis 220 and the interference force acts on the low-speed axis 220 by driving the high-speed axis 320, the combined position y500 of the position of the low-speed axis 220 and the position of the high-speed axis 320 can precisely track the given combined command value Xr130.

Because the effect of cancellation by the first interference force cancellation input 135 and the effect of cancellation by the second interference force cancellation input 134 are independently exerted, an effect of improving tracking accuracy can be obtained even when one of them is used. That is, although it has been described in the above that the cooperative control system 1000b includes both the high-speed axis interference force calculation unit 141 which cancels the first interference force and the low-speed axis interference force calculation unit 142 which cancels the second interference force, the cooperative control system 1000b may include only one of the units.

The high-speed axis interference force calculation unit 141 may be provided in the low-speed axis control device 210b or the high-speed axis control device 310b. The low-speed axis interference force calculation unit 142 may be provided in the low-speed axis control device 210b or the high-speed axis control device 310b.

As described above, according to the third embodiment, the high-speed axis interference force calculation unit 141 calculates the first interference force, which is the interference force exerted on the high-speed axis 320 by the low-speed axis 220 being driven, based on the low-speed axis command value Xrs132, and inputs the first interference force cancellation input 135 to the adder 312, thereby subtracting the first interference force from the high-speed axis thrust command value. This makes it possible to eliminate the influence of the first interference force from the high-speed servo system 300b, and thus tracking accuracy is improved.

The low-speed axis interference force calculation unit 142 calculates the second interference force, which is the interference force exerted on the low-speed axis 220 by the high-speed axis 320 being driven, based on the high-speed axis command value Xrf133, and inputs the second interference force cancellation input 134 to the adder 212, thereby subtracting the second interference force from the low-speed axis thrust command value. This makes it possible to eliminate the influence of the second interference force from the low-speed servo system 200b, and thus tracking accuracy is improved.

Note that the third embodiment can be applied to the cooperative control system of the second embodiment. Specifically, the first transfer function is equal to "1" and the second transfer function may be constituted by the product of the low-speed axis model transfer function Gs' and the inverse high-speed axis model transfer function 1/Gf'. Even in that case, the same effect as the effect of the third embodiment described above can be obtained.

Fourth Embodiment

In the fourth embodiment, a reference model servo system is applied to a servo system of each axis. In the reference model servo system, an inverse model of an object to be controlled is used, and thereby compensation control is performed to cause a reference model position to coincide with output of the object to be controlled. The reference model position is output by a reference model set in the reference model servo system.

In the first and second embodiments, a designer needs to obtain the transfer function which models the characteristics of the low-speed servo system 200 and the transfer function which models the characteristics of the high-speed servo system 300. However, in the fourth embodiment, the reference model servo system is adopted, and thereby the reference model set in the reference model servo system can be used as it is as a model exhibiting characteristics of the servo system.

Figure 7:
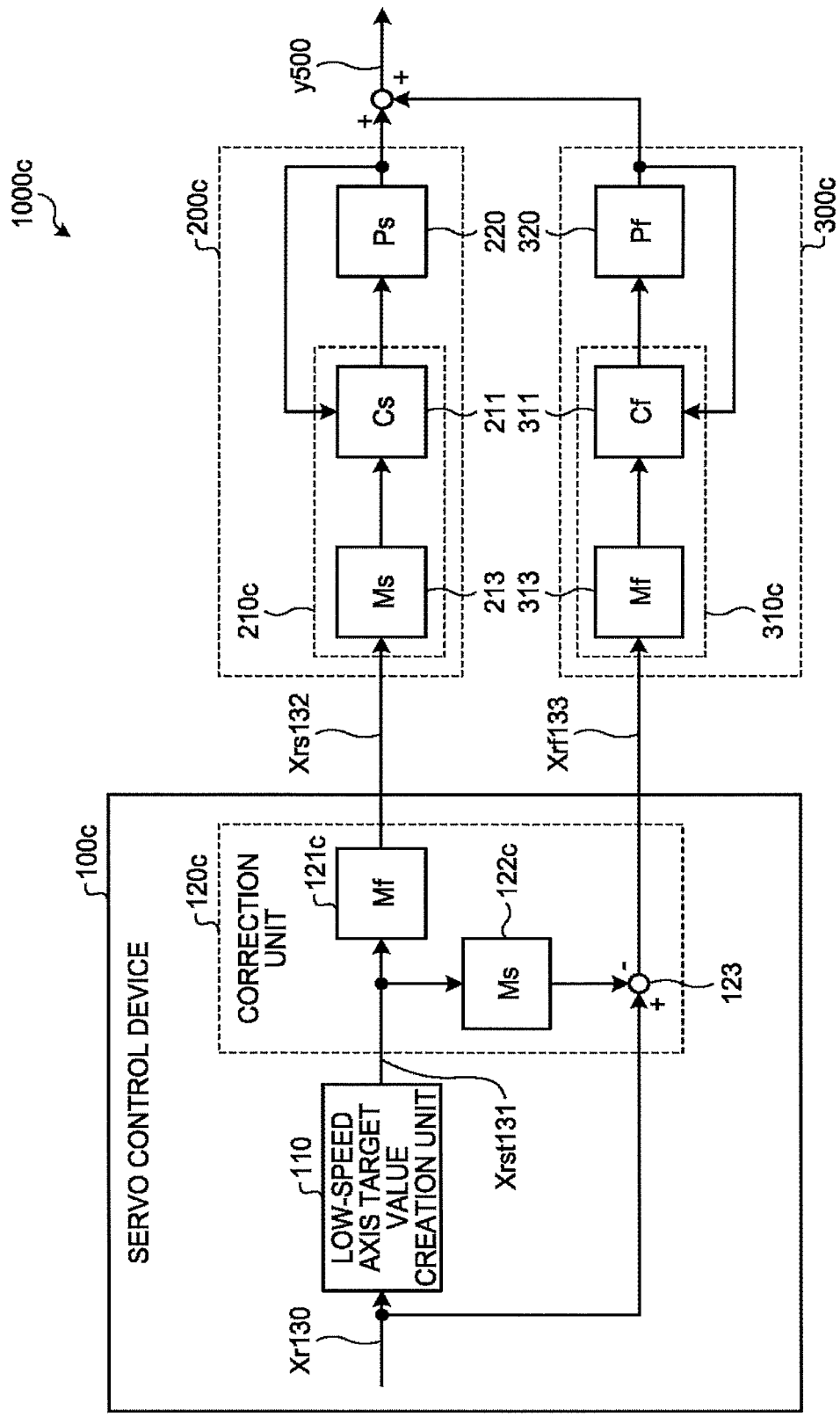
FIG. 7 is a diagram illustrating a functional configuration of a cooperative control system of a fourth embodiment.

FIG. 7 is a diagram illustrating a functional configuration of a cooperative control system of the fourth embodiment. Reference signs 1000c, 100c, 200c, and 300c are assigned to the cooperative control system of the fourth embodiment, a servo control device of the fourth embodiment, a low-speed servo system of the fourth embodiment, and a high-speed servo system of the fourth embodiment, respectively. In addition, the same names and reference signs as those in the first embodiment are assigned to components in common with the first embodiment, and overlapping descriptions will be omitted.

Each of the low-speed servo system 200c and the high-speed servo system 300c is a servo system to which the reference model servo system is applied.

The low-speed servo system 200c includes a low-speed axis control device 210c and a low-speed axis 220. The low-speed axis control device 210c includes the low-speed axis compensation unit 211 which is a first axis compensation unit and a low-speed axis reference model 213 which is a first axis reference model unit. The low-speed axis reference model 213 calculates a low-speed axis reference model position which is a first axis reference model position based on the low-speed axis command value Xrs132, and outputs the low-speed axis reference model position. A transfer function of the low-speed axis reference model 213 is expressed as Ms. Based on a position signal from the position detector 223, the low-speed axis compensation unit 211 calculates a low-speed axis thrust command value so that the position of the low-speed axis 220 coincides with the low-speed axis reference model position, and inputs the calculated low-speed axis thrust command value to the amplifier 221.

Figure 8:
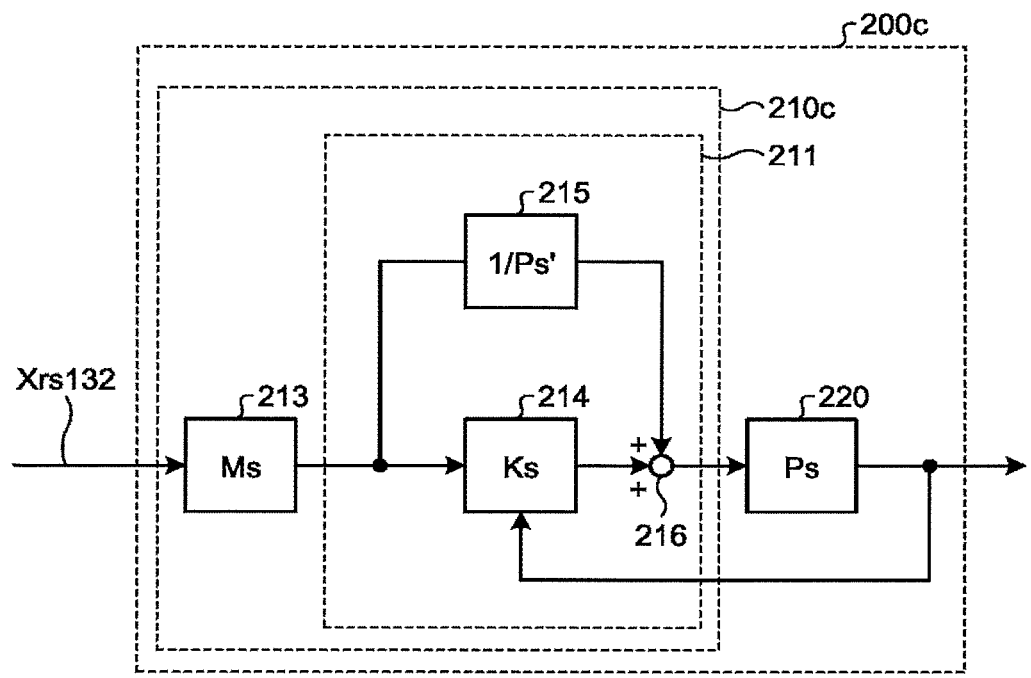
FIG. 8 is a diagram illustrating a detailed functional configuration of a low-speed servo system of the fourth embodiment.

FIG. 8 is a diagram illustrating a detailed functional configuration of the low-speed servo system 200c.

The low-speed axis reference model 213 performs filtering on the low-speed axis command value Xrs132 using a filter having a high-frequency band cutoff characteristic, and outputs the low-speed axis reference model position. In one example, the filter of the low-speed axis reference model 213 is a second-order low pass filter.

The low-speed axis compensation unit 211 includes a feedback control unit 214, a low-speed axis inverse model 215, and an adder 216. Based on the low-speed axis reference model position and an output position of the low-speed axis 220, the feedback control unit 214 executes calculation including proportional calculation, integration, or differentiation, thereby creating feedback input for reducing a difference between the low-speed axis reference model position and the output position of the low-speed axis 220. A transfer function of the feedback control unit 214 is expressed as Ks. The low-speed axis inverse model 215 is a transfer function 1/Ps' which models inverse characteristics of the characteristics of the low-speed axis 220, and converts the low-speed axis reference model position into feedforward input using the transfer function 1/Ps'. The adder 216 calculates the low-speed axis thrust command value by adding the feedback input and the feedforward input.

With the above configuration, the low-speed axis compensation unit 211 can calculate the low-speed axis thrust command value so that the position of the low-speed axis 220 coincides with the low-speed axis reference model position.

The product of the transfer function Ps of the low-speed axis 220 and the transfer function 1/Ps' of the low-speed axis inverse model 215 is "1". Therefore, a transfer function from the low-speed axis command value Xrs132 to the output position of the low-speed axis 220, that is, a transfer function of the low-speed servo system 200c coincides with the transfer function Ms of the low-speed axis reference model 213 with high accuracy.

The high-speed servo system 300c includes a high-speed axis control device 310c and the high-speed axis 320. The high-speed axis control device 310c includes the high-speed axis compensation unit 311 which is a second axis compensation unit, and a high-speed axis reference model 313 which is a second axis reference model unit. The high-speed axis reference model 313 calculates a high-speed axis reference model position based on the high-speed axis command value Xrf133, and outputs the high-speed axis reference model position. A transfer function of the high-speed axis reference model 313 is expressed as Mf. Based on a position signal from the position detector 323, the high-speed axis compensation unit 311 calculates a high-speed axis thrust command value so that the position of the high-speed axis 320 coincides with the high-speed axis reference model position. The high-speed axis compensation unit 311 inputs the calculated high-speed axis thrust command value to the amplifier 321.

Figure 9:
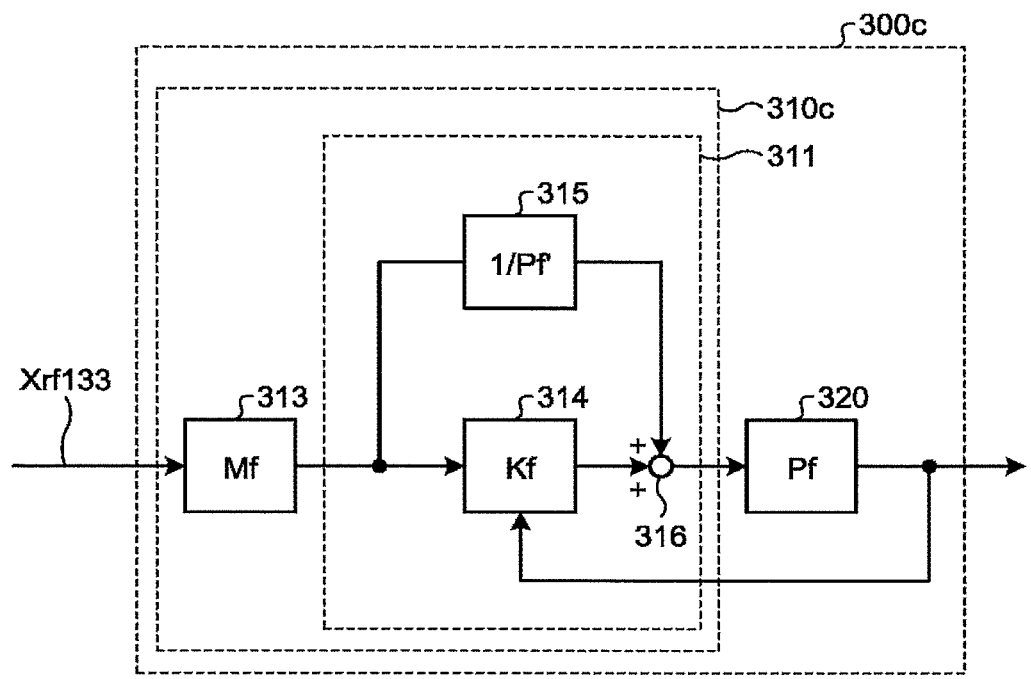
FIG. 9 is a diagram illustrating a detailed functional configuration of a high-speed servo system of the fourth embodiment.

FIG. 9 is a diagram illustrating a detailed functional configuration of the high-speed servo system 300c.

The high-speed axis reference model 313 performs filtering on the high-speed axis command value Xrf133 using a filter having a high-frequency band cutoff characteristic, and outputs the high-speed axis reference model position. The transfer function of the high-speed axis reference model 313 is expressed as Mf. In one example, the filter of the high-speed axis reference model 313 is a second-order low pass filter.

The high-speed axis compensation unit 311 includes a feedback control unit 314, a high-speed axis inverse model 315, and an adder 316. Based on the high-speed axis reference model position and an output position of the high-speed axis 320, the feedback control unit 314 executes calculation including proportional calculation, integration, or differentiation, thereby creating feedback input for reducing a difference between the high-speed axis reference model position and the output position of the high-speed axis 320. A transfer function of the feedback control unit 314 is expressed as Kf. The high-speed axis inverse model 315 is a transfer function 1/Pf' which models inverse characteristics of the characteristics of the high-speed axis 320, and converts the high-speed axis reference model position into feedforward input using the transfer function 1/Pf'. The adder 316 calculates the high-speed axis thrust command value by adding the feedback input and the feedforward input.

With the above configuration, the high-speed axis compensation unit 311 can calculate the high-speed axis thrust command value so that the position of the high-speed axis 320 coincides with the high-speed axis reference model position.

The product of the transfer function Pf of the high-speed axis 320 and the transfer function 1/Pf of the high-speed axis inverse model 315 is "1". Therefore, a transfer function from the high-speed axis command value Xrf133 to the output position of the high-speed axis 320, that is, a transfer function of the high-speed servo system 300c coincides with the transfer function Mf of the high-speed axis reference model 313 with high accuracy.

Returning to FIG. 7. The servo control device 100c includes the low-speed axis target value creation unit 110 and a correction unit 120c. The correction unit 120c includes a first transfer function unit 121c, a second transfer function unit 122c, and the subtractor 123. The first transfer function unit 121c converts the low-speed axis target value Xrst131 into the low-speed axis command value Xrs132 by using a first transfer function of the fourth embodiment. The second transfer function unit 122c converts the low-speed axis target value Xrst131 by using a second transfer function of the fourth embodiment. The subtractor 123 calculates the high-speed axis command value Xrf133 by subtracting the converted low-speed axis target value Xrst131 from the combined command value Xr130.

Here, the first transfer function of the fourth embodiment is Mf, and the second transfer function of the fourth embodiment is Ms. Therefore, Formula 2 is established also in the fourth embodiment.

As described above, in the fourth embodiment, the reference model servo system is applied to each of the low-speed servo system 200c and the high-speed servo system 300c. The first transfer function is equal to the transfer function Mf of the high-speed axis reference model 313, which is the reference model set in the high-speed servo system 300c, and the second transfer function is equal to the transfer function Ms of the low-speed axis reference model 213, which is the reference model set in the low-speed servo system 200c. With the above configuration, a difference in response between the low-speed servo system 200c and the high-speed servo system 300c does not affect the combined position y500, and the response characteristic of the combined position y500 is determined by the high-speed servo system 300c. Accordingly, it is possible to achieve highly precise tracing control. In addition, it is possible to achieve more highly precise tracing control than in a case of driving the worktool 400 using only the low-speed servo system 200c.

In the case of the first and second embodiments, the designer needs to obtain the first transfer function and the second transfer function by modeling the characteristics of the low-speed servo system 200 and modeling the characteristics of the high-speed servo system 300, which results in a modeling error. In contrast, in the case of the fourth embodiment, the designer can set the known transfer function Mf which expresses the characteristics of the high-speed servo system 300c with high accuracy as the first transfer function, and can set the known transfer function Ms which expresses the characteristics of the low-speed servo system 200c with high accuracy as the second transfer function. Therefore, according to the fourth embodiment, a burden of modeling can be reduced. In addition, since the influence of errors occurring in modeling can be eliminated, it is possible to further improve accuracy of the tracing control.

Formula 2 can be established with any function adopted as the first transfer function and the second transfer function as long as the product of the first transfer function and Ms and the product of the second transfer function and Mf coincide with each other. That is, in the fourth embodiment, even when the first transfer function is "1" and the second transfer function is the product of Ms and an inverse function of Mf, as in the second embodiment, the effect of the fourth embodiment described above can be obtained.

Fifth Embodiment

In the fifth embodiment, a cooperative control system will be described which is obtained by applying the configuration for reducing the effect of the interference force described in the third embodiment to the configuration of the fourth embodiment.

Figure 10:
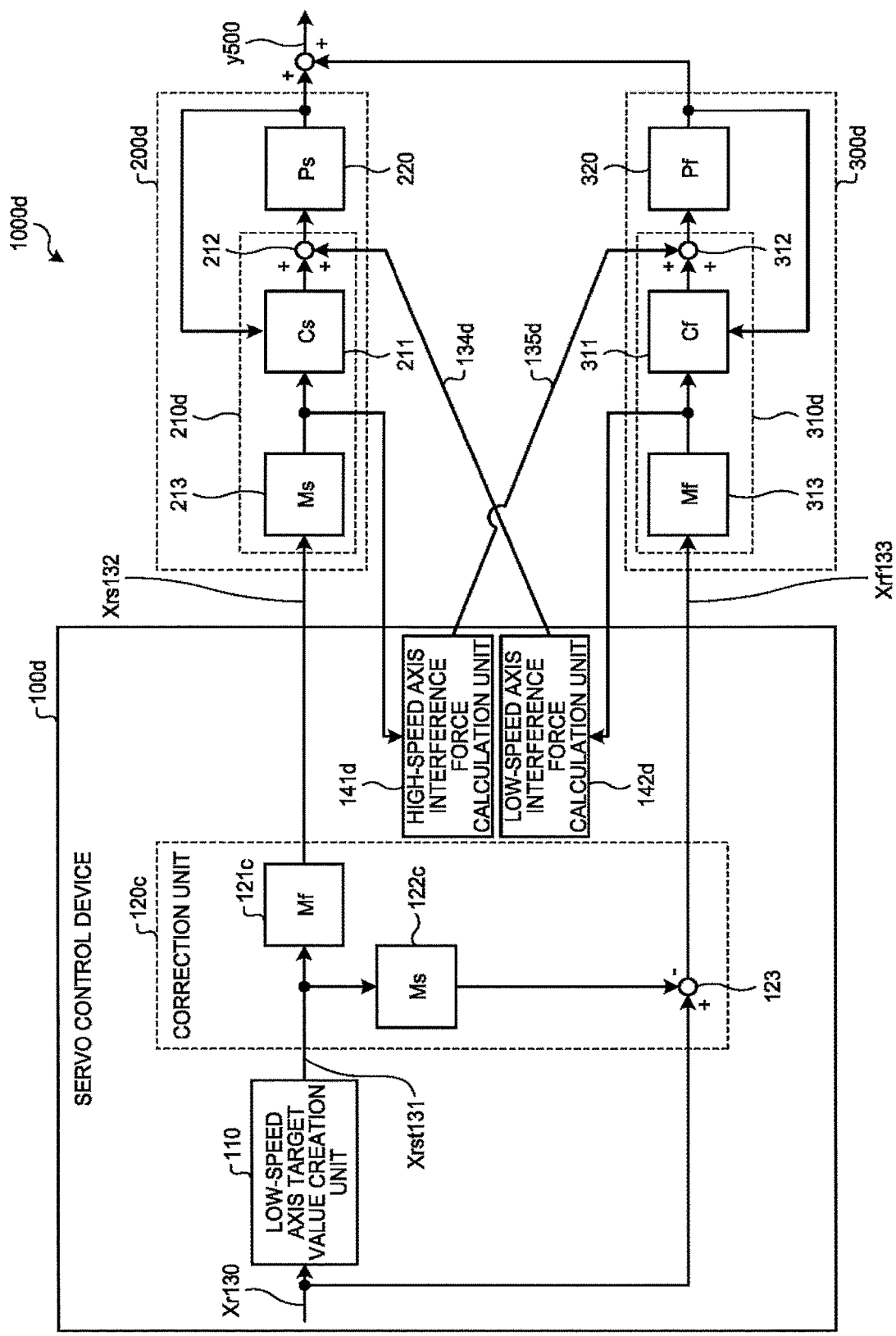
FIG. 10 is a diagram illustrating a functional configuration of a cooperative control system of a fifth embodiment.

FIG. 10 is a diagram illustrating a functional configuration of the cooperative control system of the fifth embodiment. Reference signs 1000d, 100d, 200d, and 300d are assigned to the cooperative control system of the fifth embodiment, a servo control device of the fifth embodiment, a low-speed servo system of the fifth embodiment, and a high-speed servo system of the fifth embodiment, respectively. In addition, the same names and reference signs as those in the fourth embodiment are assigned to components in common with the fourth embodiment, and overlapping descriptions will be omitted.

The servo control device 100d includes the low-speed axis target value creation unit 110, the correction unit 120c, a high-speed axis interference force calculation unit 141d, and a low-speed axis interference force calculation unit 142d. The low-speed servo system 200d includes a low-speed axis control device 210d and the low-speed axis 220. The low-speed axis control device 210d includes the low-speed axis compensation unit 211, the adder 212, and the low-speed axis reference model 213. The high-speed servo system 300d includes a high-speed axis control device 310d and the high-speed axis 320. The high-speed axis control device 310d includes the high-speed axis compensation unit 311, the adder 312, and the high-speed axis reference model 313.

Based on a low-speed axis reference model position output by the low-speed axis reference model 213, the high-speed axis interference force calculation unit 141d calculates a first interference force of the fifth embodiment acting on the high-speed axis 320 by the motor 222 driving the low-speed axis 220. Then, the high-speed axis interference force calculation unit 141d outputs a first interference force cancellation input 135d, which is a value obtained by inverting a sign of the first interference force of the fifth embodiment acting on the high-speed axis 320. Hereinafter, unless otherwise specified, the first interference force is the first interference force of the fifth embodiment.

In one example, the high-speed axis interference force calculation unit 141d includes a second-order differentiator. The high-speed axis interference force calculation unit 141d calculates the predicted acceleration As' of the low-speed axis by applying the second-order differentiator to the low-speed axis reference model position to perform differentiation twice with respect to time. A negative of a value obtained by multiplying the total weight Wf of the body driven by the motor 322 of the high-speed servo system 300d by the acceleration As of the low-speed axis 220, is an interference force generated in the high-speed axis 320 by the low-speed axis 220 being driven. Consequently, the high-speed axis interference force calculation unit 141d obtains the first interference force cancellation input 135d by multiplying the weight Wf by the predicted acceleration As' of the low-speed axis.

Based on a high-speed axis reference model position that is output by the high-speed axis reference model 313, the low-speed axis interference force calculation unit 142d calculates a second interference force of the fifth embodiment acting on the low-speed axis 220 by the motor 322 driving the high-speed axis 320. Then, the low-speed axis interference force calculation unit 142d outputs a second interference force cancellation input 134d, which is a value obtained by inverting a sign of the second interference force of the fifth embodiment acting on the low-speed axis 220. Hereinafter, unless otherwise specified, the second interference force is the second interference force of the fifth embodiment.

In one example, the low-speed axis interference force calculation unit 142d includes a second-order differentiator. The low-speed axis interference force calculation unit 142d calculates the predicted acceleration Af' of the high-speed axis by applying the second-order differentiator to the high-speed axis reference model position to perform differentiation twice with respect to time. A negative of a value obtained by multiplying the total weight Wf of the body driven by the motor 322 of the high-speed servo system 300d by the acceleration Af of the high-speed axis 320, is an interference force generated in the low-speed axis 220 by the high-speed axis 320 being driven. Consequently, the low-speed axis interference force calculation unit 142d obtains the second interference force cancellation input 134d by multiplying the weight Wf by the predicted acceleration Af' of the high-speed axis 320.

Similarly to the fourth embodiment, the low-speed axis compensation unit 211 calculates a low-speed axis thrust command value based on a position signal from the position detector 223 so that the position of the low-speed axis 220 coincides with the low-speed axis reference model position. The adder 212 adds the second interference force cancellation input 134d to the low-speed axis thrust command value, and inputs the low-speed axis thrust command value to which the second interference force cancellation input 134d has been added to the amplifier 221 of the low-speed axis 220.

Similarly to the fourth embodiment, the high-speed axis compensation unit 311 calculates a high-speed axis thrust command value based on a position signal from the position detector 323 so that the position of the high-speed axis 320 coincides with the high-speed axis reference model position. The adder 312 adds the first interference force cancellation input 135d to the high-speed axis thrust command value, and inputs the high-speed axis thrust command value to which the first interference force cancellation input 135d has been added to the amplifier 321 of the high-speed axis 320.

Because the interference forces generated in the low-speed axis 220 and the high-speed axis 320 are canceled by the second interference force cancellation input 134d and the first interference force cancellation input 135d, respectively, it is possible to eliminate the influence of the interference forces. Consequently, the transfer function from the combined command value Xr130 to the combined position y500 coincides with the transfer function Mf of the high-speed servo system 300d when the first interference force cancellation input 135d is zero. Therefore, because a difference in response between the low-speed servo system 200d and the high-speed servo system 300d does not affect the combined position y500, and the response characteristic of the combined position y500 is determined by the high-speed servo system 300d, it is possible to achieve highly precise tracing control. In addition, it is possible to achieve more highly precise tracing control than in a case of driving the worktool 400 using only the low-speed servo system 200d.

According to the fifth embodiment, the designer can set the known transfer function Mf which expresses the characteristics of the high-speed servo system 300d with high accuracy as the first transfer function, and can set the known transfer function Ms which expresses the characteristics of the low-speed servo system 200d with high accuracy as the second transfer function. According to the fifth embodiment, a burden of modeling can be reduced. In addition, because the influence of errors occurring in modeling can be eliminated, it is possible to further improve accuracy of the tracing control.

Formula 2 can be established even when any function adopted is as the first transfer function and the second transfer function, as long as the product of the first transfer function and Ms and the product of the second transfer function and Mf coincide with each other. That is, in the fifth embodiment, even when the first transfer function is "1" and the second transfer function is the product of Ms and the inverse function of Mf, as in the second embodiment, the effect of the fourth embodiment described above can be obtained.

The high-speed axis interference force calculation unit 141d calculates the first interference force, which is the interference force exerted on the high-speed axis 320 by the low-speed axis 220 being driven, based on the low-speed axis reference model position, and subtracts the first interference force from the high-speed axis thrust command value. This makes it possible to eliminate the influence of the first interference force from the high-speed servo system 300d, and thus tracking accuracy is improved.

The low-speed axis interference force calculation unit 142d calculates the second interference force, which is the interference force exerted on the low-speed axis 220 by the high-speed axis 320 being driven, based on the high-speed axis reference model position, and subtracts the second interference force from the low-speed axis thrust command value. This makes it possible to eliminate the influence of the second interference force from the low-speed servo system 200d, and thus tracking accuracy is improved.

Although it has been described that the servo control device 100d includes the high-speed axis interference force calculation unit 141d and the low-speed axis interference force calculation unit 142d, because the effect of cancellation by the first interference force cancellation input 135d and the effect of cancellation by the second interference force cancellation input 134d are independently exerted, the effect of improving tracking accuracy can be obtained even when one of them is used. That is, although it has been described in the above that the cooperative control system 1000d includes both the high-speed axis interference force calculation unit 141d which cancels the first interference force and the low-speed axis interference force calculation unit 142d which cancels the second interference force, the cooperative control system 1000d may include only one of the configurations.

The high-speed axis interference force calculation unit 141d may be provided in the low-speed axis control device 210d or the high-speed axis control device 310d. The low-speed axis interference force calculation unit 142d may be provided in the low-speed axis control device 210d or the high-speed axis control device 310d.

Sixth Embodiment

A servo control device of the sixth embodiment is obtained by adding a delay unit to the servo control device 100 of the first embodiment.

Figure 11:
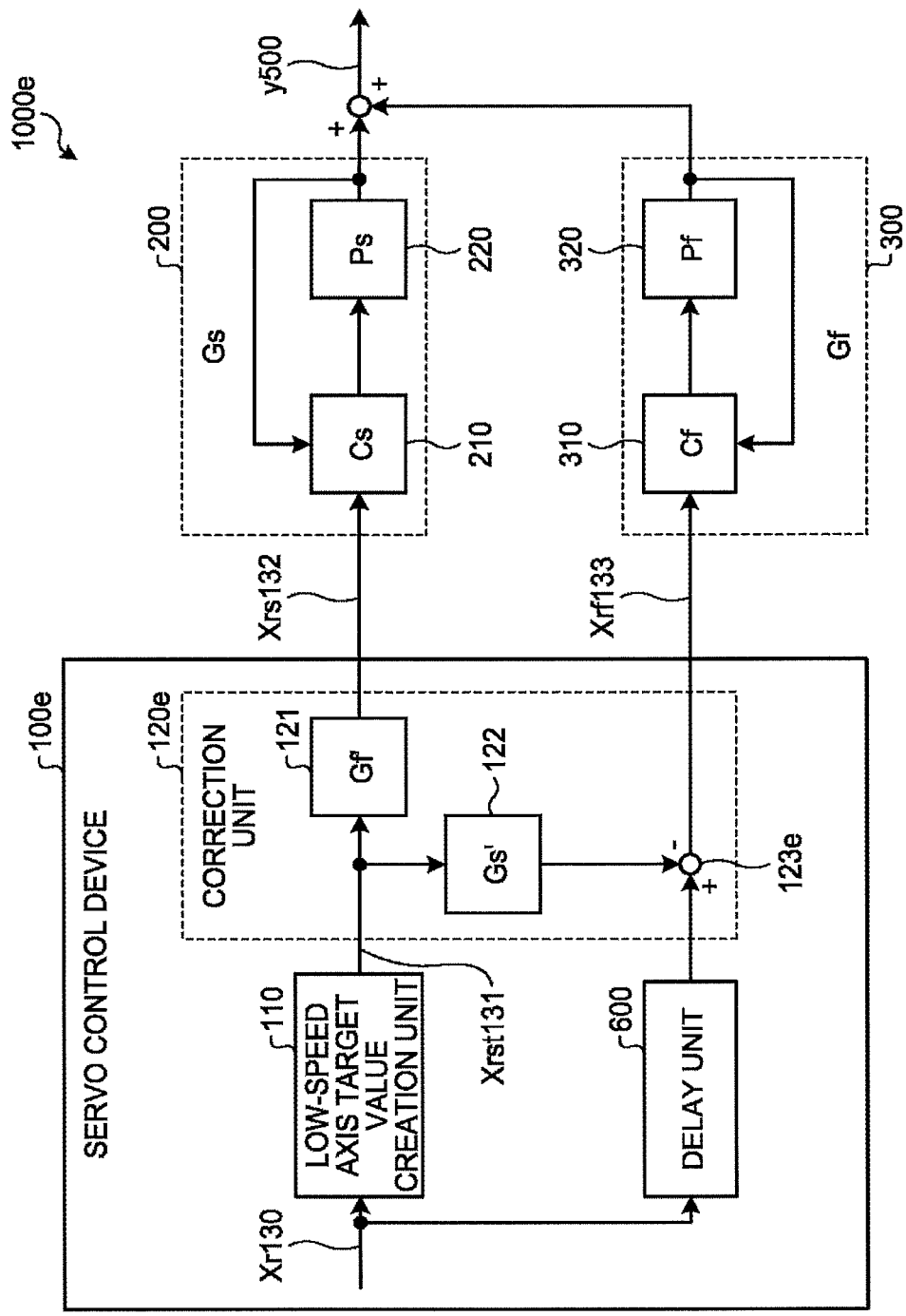
FIG. 11 is a diagram illustrating a functional configuration of a cooperative control system of a sixth embodiment.

FIG. 11 is a diagram illustrating a functional configuration of a cooperative control system of the sixth embodiment. Reference signs 1000e and 100e are assigned to the cooperative control system of the sixth embodiment and the servo control device of the sixth embodiment, respectively. In addition, the same names and reference signs as those in the first embodiment are assigned to components in common with the first embodiment, and overlapping descriptions will be omitted.

The servo control device 100e includes the low-speed axis target value creation unit 110, a correction unit 120e, and a delay unit 600.

The correction unit 120e includes the first transfer function unit 121, the second transfer function unit 122, and a subtractor 123e.

The delay unit 600 delays the combined command value Xr130 by a set time.

The subtractor 123e subtracts the low-speed axis target value converted by the second transfer function unit 122 from the combined command value delayed by the delay unit 600, thereby creating the high-speed axis command value Xrf133.

In one example, the low-speed axis target value creation unit 110 obtains the low-speed axis target value Xrst131 by causing a first-order low pass filter which blocks high-frequency components to act on the combined command value Xr130. Consequently, the low-speed axis target value Xrst131 is delayed with respect to the combined command value Xr130.

In the second transfer function unit 122, in one example, the low-speed axis target value Xrst131 is converted with the transfer function Gs' which models the characteristics of the low-speed servo system 200. Consequently, the low-speed axis target value converted by the second transfer function unit 122 is delayed with respect to the low-speed axis target value Xrst.

Because the delay occurs in each of the low-speed axis target value creation unit 110 and the second transfer function unit 122, the low-speed axis target value converted by the second transfer function unit 122 is delayed, with respect to the combined command value Xr130, by the sum of the delay generated in the low-speed axis target value creation unit 110 and the delay generated in the second transfer function unit 122.

In the first embodiment, the subtractor 123 subtracts the low-speed axis target value converted by the second transfer function unit 122 from the combined command value Xr130, thereby creating the high-speed axis command value Xrf133.

On the other hand, in the sixth embodiment, the subtractor 123e subtracts the low-speed axis target value converted by the second transfer function unit 122 from the combined command value Xr130 that is delayed by the delay unit 600, thereby creating the high-speed axis command value Xrf133.

In one example, the set time of the delay unit 600, that is, the time for which the combined command value Xr130 is delayed, is greater than zero and shorter than twice the sum of a response delay time of the second transfer function unit 122 and a response delay time of the low-speed axis target value creation unit 110. In that case, delay time or advance time between the combined command value Xr130 delayed by the delay unit 600 and the low-speed axis target value converted by the second transfer function unit 122, is shorter than the delay time between the combined command value Xr130 and the low-speed axis target value converted by the second transfer function unit 122 in the first embodiment.

Therefore, the maximum absolute value of the high-speed axis command value Xrf133, which is a difference between the delayed combined command value Xr130 and the low-speed axis target value converted by the second transfer function unit 122 in the sixth embodiment, is smaller than the maximum absolute value of the high-speed axis command value Xrf133, which is a difference between the combined command value Xr130 and the low-speed axis target value converted by the second transfer function unit 122 in the first embodiment. That is, according to the sixth embodiment, the travel distance of the high-speed axis 320 can be shortened as compared with the case of the first embodiment. In other words, it is possible to reduce unnecessary movement on the high-speed axis base 330.

When the set time is equal to the sum of the response delay time of the second transfer function unit 122 and the response delay time of the low-speed axis target value creation unit 110, the highest effect of shortening the travel distance of the high-speed axis 320 to reduce the unnecessary movement on the high-speed axis base 330 is obtained.

When a transfer function of the delay unit 600 is expressed as et, the combined position y500 is expressed as Formula 7.

$$y = Gf'GsXrst + etGfXr - Gs'GfXrst \quad \text{(Formula 7)}$$

In a configuration in which the first transfer function Gf is equal to Gf which models the characteristics of the high-speed servo system 300 and the second transfer function Gs' is equal to Gs which models the characteristics of the low-speed servo system 300, a first term and a third term of Formula 7 cancel each other out. Therefore, a transfer function Gv from the combined command value Xr130 to the combined position y500 is expressed as Formula 8.

$$Gv = etGf \quad \text{(Formula 8)}$$

This is obtained by applying the transfer function et of the delay unit 600 to Formula 2. The transfer function Gv from the combined command value Xr130 to the combined position y500 is equal to the transfer function of the high-speed servo system 300 with the delay et.

In other words, the transfer function Gv from the combined command value Xr130 to the combined position y500 can be made to coincide with the transfer function of the high-speed servo system 300 plus the delay et. Therefore, it is possible to cause the combined position y500 of the position of the low-speed axis 220 and the position of the high-speed axis 320 to track the given combined command value Xr130 with high response. In other words, in the cooperative control system 1000e which includes the low-speed servo system 200 and the high-speed servo system 300 having higher response than the low-speed servo system 200, tracing control with high accuracy can be achieved.

Thus, according to the sixth embodiment, the delay unit 600 is provided which delays the combined command value Xr130 by the set time. The correction unit 120e calculates the high-speed axis command value Xrf133 by subtracting the low-speed axis target value that is converted by the second transfer function unit 122 from the combined command value Xr130 that is delayed by the delay unit 600. Here, the set time is greater than zero and shorter than twice the sum of the response delay time of the second transfer function unit 122 and the response delay time of the low-speed axis target value creation unit 110. This makes it possible to shorten the travel distance of the high-speed axis 320 to reduce the unnecessary movement on the high-speed axis base 330. Consequently, the sixth embodiment can be applied to a servo control device which controls a machine to be controlled having a small movable range of the high-speed axis base 330 in comparison with the other embodiments.

As the set time, the sum of the response delay time of the second transfer function unit 122 and the response delay time of the low-speed axis target value creation unit 110 may be set. In that case, the highest effect of shortening the travel distance of the high-speed axis 320 to reduce the unnecessary movement on the high-speed axis base 330 is obtained.

The sixth embodiment is also applicable to the cooperative control systems of the second to fifth embodiments.

The configuration described in each embodiment above indicates one example of the content of the present invention and can be combined with other known technology, and a part thereof can be omitted or modified without departing from the gist of the present invention.

REFERENCE SIGNS LIST

1 computing device; 2 storage device; 3 input/output device; 4 bus; 100, 100a, 100b, 100c, 100d, 100e servo control device; 110 low-speed axis target value creation unit; 120, 120a, 120c, 120e correction unit; 121, 121c first transfer function unit; 122, 122a, 122c second transfer function unit; 123, 123e subtractor; 124 third transfer function unit; 125 fourth transfer function unit; 134, 134d second interference force cancellation input; 135, 135d first interference force cancellation input; 141, 141d high-speed axis interference force calculation unit; 142, 142d low-speed axis interference force calculation unit; 200, 200b, 200c, 200d low-speed servo system; 210, 210b, 210c, 210d low-speed axis control device; 211 low-speed axis compensation unit; 212 adder; 213 low-speed axis reference model; 214 feedback control unit; 215 low-speed axis inverse model; 216 adder; 220 low-speed axis; 221 amplifier; 222 motor; 223 position detector; 230 low-speed axis base; 300, 300b, 300c, 300d high-speed servo system; 310, 310b, 310c, 310d high-speed axis control device; 311 high-speed axis compensation unit; 312 adder; 313 high-speed axis reference model; 314 feedback control unit; 315 high-speed axis inverse model; 316 adder; 320 high-speed axis; 321 amplifier; 322 motor; 323 position detector; 330 high-speed axis base; 400 worktool; 600 delay unit; 1000, 1000a, 1000b, 1000c, 1000d, 1000e cooperative control system.

The invention claimed is:

1. A servo control device that includes a first servo system that causes a position of a first axis driven by a first motor on a first axis base to track a first axis command value and a second servo system that causes a position of a second axis driven by a second motor on a second axis base moving in a same direction as the first axis base to track a second axis command value, a response of the second servo system being higher than a response of the first servo system, and controls a combined position of the position of the first axis and the position of the second axis, the servo control device comprising:
   a processor to execute a program, and
   a memory to store the program which, when executed by the processor, performs processes of,
   creating a first axis target value based on a combined command value that is a position command value of the combined position; and
   correction which includes converting the first axis target value into the first axis command value by using a first transfer function, converting the first axis target value by using a second transfer function, and calculating the second axis command value by subtracting the converted first axis target value from the combined command value, a product of the first transfer function and a first model transfer function that models characteristics of the first servo system being equal to a product of the second transfer function and a second model transfer function that models characteristics of the second servo system.

2. The servo control device according to claim 1, wherein the first transfer function is equal to the second model transfer function, and
   the second transfer function is equal to the first model transfer function.

3. The servo control device according to claim 1, wherein the first transfer function is 1 and the first axis command value is equal to the first axis target value, and
   the second transfer function is equal to a product of the first model transfer function and an inverse of the second model transfer function.

4. The servo control device according to claim 1, wherein the second servo system comprises a second axis compensation calculator to calculate a second axis thrust command value to be input to an amplifier of the second motor based on compensation control for causing the position of the second axis to track the second axis command value, and
   the servo control device further comprises a first interference force calculator to calculate a first interference force that is an interference force exerted on the second axis by the first axis being driven, based on the first axis command value, and subtracts the calculated first interference force from the calculated second axis thrust command value.

5. The servo control device according to claim 1, wherein the first servo system comprises a first axis compensation calculator to calculate a first axis thrust command value to be input to an amplifier of the first motor based on compensation control for causing the position of the first axis to track the first axis command value, and
   the servo control device further comprises a second interference force calculator to calculate a second interference force that is an interference force exerted on the first axis by the second axis being driven, based on the second axis command value, and subtracts the calculated second interference force from the calculated first axis thrust command value.

6. The servo control device according to claim 1, wherein the first servo system comprises a first axis reference model calculator to calculate a first axis reference model position based on the first axis command value, and a first axis compensation calculator to calculate a first axis thrust command value to be input to the amplifier of the first motor based on compensation control for causing the first axis reference model position to coincide with the position of the first axis,
   the second servo system comprises a second axis reference model calculator to calculate a second axis reference model position based on the second axis command value, and a second axis compensation calculator to calculate a second axis thrust command value to be input to the amplifier of the second motor based on compensation control for causing the second axis reference model position to coincide with the position of the second axis,
   the first model transfer function is equal to a transfer function of the first axis reference model calculator, and the second model transfer function is equal to a transfer function of the second axis reference model unit calculator.

7. The servo control device according to claim 6, wherein
the first transfer function is equal to the transfer function of the second axis reference model calculator, and
the second transfer function is equal to the transfer function of the first axis reference model calculator.

8. The servo control device according to claim 6, wherein
the first transfer function is 1 and the first axis command value is equal to the first axis target value, and
the second transfer function is equal to a product of an inverse of the transfer function of the second axis reference model calculator and the transfer function of the first axis reference model calculator.

9. The servo control device according to claim 6, further comprising:
a first interference force calculator to calculate a first interference force that is an interference force exerted on the second axis by the first axis being driven, based on the first axis reference model position, and subtract the calculated first interference force from the calculated second axis thrust command value.

10. The servo control device according to claim 6, further comprising:
a second interference force calculator to calculate a second interference force that is an interference force exerted on the first axis by the second axis being driven, based on the second axis reference model position, and subtract the calculated second interference force from the calculated first axis thrust command value.

11. The servo control device according to claim 1, wherein
a control band of the second servo system is higher than a control band of the first servo system.

12. The servo control device according to claim 1, wherein
an acceleration limit value of the second axis is larger than an acceleration limit value of the first axis.

13. The servo control device according to claim 1, the processor further delaying the combined command value by a set time, wherein
the set time is greater than zero and shorter than twice a sum of a response delay time of the second transfer function and a response delay time of the creating the first axis target value, and
in the correction, the second axis command value is calculated by subtracting the converted first axis target value from the combined command value delayed by the delaying.

14. The servo control device according to claim 13, wherein
the set time is equal to a sum of the response delay time of the second transfer function and the response delay time of the creating the first axis target value.

* * * * *